Patented May 20, 1952

2,597,717

UNITED STATES PATENT OFFICE 2,597,717

METHYLENEBISPHENOLS DERIVED FROM 6-CHLOROTHYMOL

Herman Eldridge Faith, Indianapolis, Ind., assignor to Allied Laboratories, Inc., Kansas City, Mo., a corporation of Delaware No Drawing. Application October 11, 1949, Serial No. 120,829

5 Claims. (Cl. 260—619)

The present invention relates to substituted methylenebisphenols derived from 6-chlorothymol.

I discovered that 2-hydroxymethyl-6-chlorothymol can be reacted with phenols or substituted phenols to produce a new class of chemical compounds. My new compounds are especially useful as bactericidal and fungicidal agents.

The compounds of my invention include those represented by the following general formula:

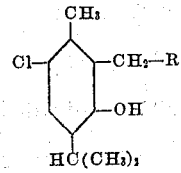

where R represents phenol or substituted phenol radicals. The preferred substituted phenols are alkyl and/or halogen substituted ones.

In general my new compounds can be prepared as illustrated by the following reaction scheme.

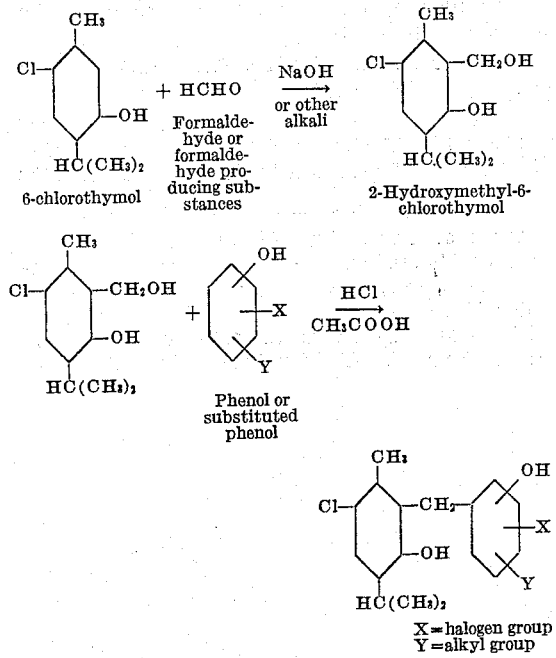

X = halogen group
Y = alkyl group

The invention will be specifically illustrated by the following specific example:

EXAMPLE 1

Preparation of 2,2'-dihydroxy-3-isopropyl-5,5'-dichloro-6-methyldiphenylmethane

Preparation of intermediate 2-hydroxymethyl-6-chlorothymol. (This compound is claimed in my copending application, Serial No. 120,830, filing date October 11, 1949, which matured into Patent No. 2,560,760 on July 17, 1951.)

Eighteen and one-half parts of 6-chlorothymol are dissolved in 50 parts of water containing 4.4 parts of sodium hydroxide. To this are added 7.8 parts of 40% aqueous formaldehyde solution (Formalin). The solution is allowed to stand until no formaldehyde odor is evident (36–48 hours). Then it is acidified with acetic acid. The solid precipitate is filtered off, dissolved in ether, and dried with magnesium sulfate. The ether is removed by distillation and the residue is diluted with petroleum ether, causing the product to precipitate as white crystals melting 62–64° C.; yield 54%.

2,2'-dihydroxy-3-isopropyl-5,5'-dichloro-6-methyldiphenylmethane

Ten parts of 2-hydroxymethyl-6-chlorothymol and 6.28 parts of p-chlorophenol are dissolved in 30 parts of glacial acetic acid and the solution is kept at 0° to 5° for four to five hours and is then allowed to stand at room temperature for nineteen to twenty hours. The reaction mixture is then diluted with petroleum ether and the precipitate is filtered from the liquid and washed with petroleum ether. It is then crystallized from naphtha. It melted at 134.5–135.5° C.

EXAMPLE 2

Preparation of 2,2'-dihydroxy-3-isopropyl-5-chloro-5'-t-butyl-6-methyldiphenylmethane Ten grams (0.0465 mole) of 2-hydroxymethyl-6-chlorothymol and 7.35 g. (0.049 mole) of p-t-butylphenol were dissolved in 30 ml. of glacial acetic acid. The solution was cooled by ice bath and saturated with hydrogen chloride. After being maintained at 0–5° for four hours, the reaction mixture was allowed to stand at room temperature until twenty-four hours had elapsed from the time the reaction was started. Crystals separated from the solution. The mixture was filtered and washed with petroleum ether. The filtrate was concentrated, diluted with petroleum ether, and cooled to obtain more product. Yield 10.35 g. (64%); M. P. 157–159° C. Recrystallized from heptane; M. P. 158–159°. It is sparingly soluble in aqueous sodium hydroxide solution but readily soluble in aqueous-alcohol sodium hydroxide. It is also soluble in benzene and in ethanol.

EXAMPLE 3

Preparation of 2,4'-dihydroxy-6,2'-dimethyl-3,5'-diisopropyl-5-chlorodiphenylmethane A solution of 19.6 g. (0.091 mole) of 2-hydroxymethyl-6-chlorothymol was reacted with 14.4 g. (0.0965 mole) of thymol in 60 mol. of glacial acetic acid as in Example 2. The product was crystallized from a heptanebenzene solution. It melted 174–176°. Yield, 7.34 g.( 23.2%). It is soluble in aqueous-alcoholic sodium hydroxide solution, in ethanol, and in chloroform.

EXAMPLE 4

*Preparation of 2,2'-methylenebis(6-chlorothymol)*

6-chlorothymol (14.8 g., 0.08 mole) was condensed with 1.26 g. of paraformaldehyde (equivalent to ca. 0.04 mole of formaldehyde) in 12 ml. of glacial acetic acid. This mixture was then treated as in Example 3. The reaction produced 6.7 g. (44%) of 2,2'-methylenebis(6-chlorothymol) after crystallization from naphtha. M. P. 128–129°. It is sparingly soluble in aqeous sodium hydroxide solution and soluble in aqueous-alcoholic sodium hydroxide.

EXAMPLE 5

*Preparation of 2,2' - dihydroxy - 3 - isopropyl - 3' - iodo - 5 - chloro - 5' - t - butyl - 6 - methyl - diphenylmethane*

Six and one-half parts of 2,2' - dihydroxy - 3 - isopropyl - 5 - chloro - 5' - t - butyl - 6 - methyldiphenylmethane are dissolved in 35 parts of alcohol. To this are added 84 parts of 20% ammonium hydroxide solution. Next, 4.9 parts of iodine and 10 parts of potassium iodide are dissolved in 40 parts of water and added to the alcohol solution in portions, allowing the iodine color to disappear from the reaction mixture between additions. Toward, the end of the addition period, the mixture is warmed to 35° C. to accelerate the iodination reaction. The mixture is stirred for one hour after the addition of the iodine and is then diluted with water to three times its volume. The product is filtered off and dried. It is dissolved in hot heptane, filtered, and cooled to recover some of the unreacted diphenylmethane. The filtrate is subjected to vacuum distillation to remove the solvent and the residue is crystallized from acetic acid. Then the product is crystallized from the naphtha for final purification. M. P. 126–127° C.

Among the various substituted phenols that can be reacted with 2-hydroxymethyl-6-chlorothymol instead of those used in the specific examples are p-t-butyl-3-methyl-4-chlorophenol, p-t-amylphenol, p-secondary-butylphenol, p-n-hexylphenol, p-arsenophenol, p-bromophenol, p-nitrophenol and the like.

Instead of aqueous formaldehyde and paraformaldehyde the formaldehyde producing substances methyl formal, ethyl formal and trioxane may be utilized.

Having thus described my invention, I claim:

1. Compounds having the following general formula:

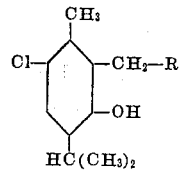

where R is a member of the group consisting of phenol and substituted phenol radicals.

2. Compounds having the following general formula:

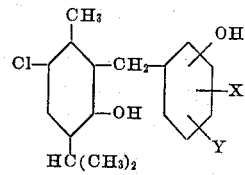

in which X represents a halogen of the group consisting of chlorine, bromine, and iodine and Y represents an alkyl group.

3. The compound 2,2' - dihydroxy - 3,3' - di - isopropyl - 5,5' - dichloro - 6,6' - dimethyldiphenylmethane.

4. The compound 2,2' - dihydroxy - 3 - isopropyl - 5,5' - dichloro - 6 - methyldiphenylmethane.

5. The compounds 2,2' - dihydroxy - 3 - isopropyl - 3' - iodo - 5 - chloro - 5' - t - butyl - 6 - methyldiphenylmethane.

HERMAN ELDRIDGE FAITH.

REFERENCES CITED

The following references are of record in the file of this patent:

UNITED STATES PATENTS

| Number | Name | Date |
| --- | --- | --- |
| 1,614,171 | Amann et al. | Jan. 11, 1927 |
| 1,880,566 | Weiler et al. | Oct. 4, 1932 |
| 1,926,874 | Klarmann et al. | Sept. 12, 1933 |

OTHER REFERENCES

Thomas: Anhydrous Aluminum Chloride In Organic Chemistry, page 629 (1 page only), Reinhold Pub. Corp., New York (1941). (Patent Office Library.)

Florestano: Chem. Abst., vol. 43, col. 8614, 8615 (1949), 2 pages. (Patent Office Library.)